United States Patent
Murakami et al.

(10) Patent No.: US 6,792,768 B2
(45) Date of Patent: Sep. 21, 2004

(54) LOW TEMPERATURE PHYSICAL DISTRIBUTION SYSTEM AND METHOD AND APPARATUS FOR MAINTAINING QUALITY IN AUCTION MARKET

(75) Inventors: Masaru Murakami, Tokyo (JP); Yasuhiro Hirao, Tokyo (JP)

(73) Assignee: Mayekawa Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/338,902

(22) Filed: Jan. 9, 2003

(65) Prior Publication Data

US 2003/0131616 A1 Jul. 17, 2003

Related U.S. Application Data

(62) Division of application No. 10/024,618, filed on Dec. 21, 2001, now Pat. No. 6,532,761.

(30) Foreign Application Priority Data

Dec. 21, 2000 (JP) ..................................... 2000-388330
Jul. 16, 2001 (JP) ..................................... 2001-215467
Sep. 28, 2001 (JP) ..................................... 2001-301613

(51) Int. Cl.[7] .............................................. F25D 17/04
(52) U.S. Cl. ................................... 62/176.6; 236/44 C
(58) Field of Search ............................. 62/176.6, 256, 62/426, 246; 454/188, 191; 160/135; 705/16, 80; 236/44 C (56) References Cited

U.S. PATENT DOCUMENTS

| | | | |
|---|---|---|---|
| 4,700,547 A | 10/1987 | Hayashi ......................... | 62/65 |
| 5,261,251 A | 11/1993 | Galiyano .................... | 62/176.6 |
| 5,412,193 A * | 5/1995 | Swartz et al. ................ | 235/383 |
| 5,520,095 A * | 5/1996 | Huber et al. .................. | 99/332 |
| 6,182,454 B1 * | 2/2001 | McNeilan .................. | 62/176.4 |
| 6,494,833 B1 * | 12/2002 | Newman et al. ............. | 600/309 |
| 6,502,409 B1 * | 1/2003 | Gatling et al. .................. | 62/80 |
| 2001/0007138 A1 * | 7/2001 | Iida et al. ...................... | 714/25 |

FOREIGN PATENT DOCUMENTS

| | | | |
|---|---|---|---|
| FR | 2385577 A | * | 12/1978 |
| JP | 352137930 A | * | 11/1977 |
| JP | 410042807 A | * | 2/1998 |
| JP | 2000014315 | | 1/2000 |
| JP | 2000201618 | | 7/2000 |
| JP | 2001140452 A | | 5/2001 |
| JP | 2001304616 A | | 10/2001 |

OTHER PUBLICATIONS

English translation of "Open Top Type Zone Air Conditioning System in an Auction Market" (18 pages).
Video tape created by applicant.
Eight (8) photographs created by applicant.

* cited by examiner

Primary Examiner—William Doerrler
Assistant Examiner—Mohammad M. Ali
(74) Attorney, Agent, or Firm—Crowell & Moring LLP (57) ABSTRACT

The present invention provides low temperature zone forming equipment having a storage function capable of controlling temperature and humidity and a method and equipment for maintaining the quality of hauled fishes in an auction market of marine products such as fishes shellfishes, which constitute a low temperature distribution system closely linked with a purchase and sale system in consideration of the characteristics of the market.

The low temperature zone forming equipment used in the low temperature distribution system is composed of a chilled air generator 1 and an enclosure wall 3 of flexible hollow structure, said enclosure wall having openings for entrance and exit of water at an end part thereof and openings for supplying chilled air produced in said chilled air generator and having exhaust openings formed of knitted cloth along the inside of the enclosure wall.

5 Claims, 4 Drawing Sheets

LOW TEMPERATURE PHYSICAL DISTRIBUTION SYSTEM AND METHOD AND APPARATUS FOR MAINTAINING QUALITY IN AUCTION MARKET

BACKGROUND OF THE INVENTION

1. Field of the Invention

The present invention relates to a low temperature physical distribution system, specifically a low temperature physical distribution system having a purchase and sale system aside from the distribution system for handling perishable foods including hauled fishes of which storage management is absolutely necessary when keeping the objects to be distributed in storage for maintaining the quality thereof, and a method and an apparatus for maintaining the quality thereof in an auction market of marine products.

2. Description of the Related Art

There are two types of systems of distributing perishable foods including hauled fishes, i.e., a conventional distribution system in which merchandise are gathered in a market and traders trade while ascertaining the quality according to their experiences and five senses; and a distribution system utilizing information technology, wherein the trade is done in a virtual market, that is, the low temperature distribution system is separated from the purchase and sale system.

In the case of a distribution system where the trade is completed on a ship and the distribution target place is already determined when hauled fishes are landed, there is no problem as the temporary storage thereof is not necessary. However, in both systems mentioned above, problems have been indicated concerning the temporary storage at the step of trade in the market, and improvements have been proposed.

In Japanese Unexamined Patent Publication No.2000-14315 is disclosed an apparatus and method of displaying and storing hauled fishes in storage capable of hygienic storage aiming to solve the problems which arise from the sale at auction on floor concerning hygiene and quality of the hauled fishes.

Namely, a display and storage apparatus which is composed of a cooling section having a brine passage provided inside a cooling plate capable of displaying hauled fishes on the surface thereof and a thermal insulation section provided at the bottom of the cooling section, a brine for food use being supplied to the brine passage, is provided in a fish market, and the distribution process of hauled fishes is done on the display and storage apparatus.

Said display and storage apparatus is surrounded by an enclosure wall of appropriate height to keep the temperature of the hauled fishes at a uniform temperature by preventing the diffusion of cold air. It is claimed that the whole temperature of the hauled fishes is maintained stable and uniform by properly adjusting the height of the surrounding wall and the quantity of air introduction in accordance with the condition and state of display of the hauled fishes.

This proposal is satisfying in regard to temperature control, however, much time and effort are needed to replace the hauled fishes onto the cooling plate, as the cooling plate is fixed on the floor. Besides, no concrete mention is made of the construction of the surrounding wall.

Moreover, as no control means for humidity control of the low temperature region, the space for displaying the hauled fishes is provided, the problem of deterioration in quality due to transfer of water from the surface of the hauled fishes and drying thereof arises.

In Japanese Unexamined Patent Publication No.2000-201618 is proposed an improvement of a drainboard for placing fish thereon used in a sale at auction of tuna fish. The proposal is intended to provide a hygienic, durable, and lightweight drainboard which, at the same time, is improved in the easiness in handling with a hook and does not damage the skin or body of the fish when tuna fish is placed on or removed from the drainboard. Aluminum is used for the material of the plates and crosspieces composing the drainboard, and a sloped face is formed along the side of the plate in full length to prevent the damage of the skin of the fish.

Comparatively simple apparatuses such as the hook and the drainboard are used in a fish market, as cited in the disclosure.

This is because there is a characteristics situation of a fish market that the fish market has a public function to cope with emergency cases in addition to its proper function.

It is assumed that the market is used for disaster relief using ships and as an emergency shelter for people, as it is located adjacent to a wharf. Therefore, an equipment which would become obstacle in such an emergency is not allowed to be installed or placed in the market other than when it is used as an auction market. The equipment for trading is demanded to be installed and removed speedily. The fact that equipment of which the installation requires much expense of time and effort is not accepted and hooks and drainboards are used conveniently is thought to be due to the circumstance mentioned above.

When handling frozen tuna fish, condensation of moisture in the surrounding air on the surface of the fish or frosting occurs. The condensation heat or heat of solidification due to the phase-change of water effects thawing of the frozen fish, which causes the problem that the skin of the fish is damaged and in its turn the quality is deteriorated.

Therefore, the control of humidity of the surrounding air of hauled fishes is also an important factor for maintaining quality.

Recently, a greater number of distribution systems have become separated from a purchase and sale system owing to the development of information technology. So, a purchase and sale system based on objective data such as, in the case of hauled fishes, production region, name of fishing boat, history of storage temperature, analysis data of freshness and so on has become increasingly adopted instead of a system in which traders trade based on their experience and mutual reliance while observing the products of trade closely and ascertaining the quality of them.

It is probable that the products of trade landed on a market in Okinawa can be traded in a market in Hokkaido. Therefore, in a system requiring temperature control, more severe temperature control and disclosure of data have become necessary.

By the way, the quality change due to microorganisms is the cause which induces problems the most frequently among the causes of the deterioration of food quality. Microorganisms such as bacteria, mold, and yeast cause the quality change.

Among them, enteritis Vibrio is the one on which prime importance is put as food poisoning microbe in Japan. This microbe is comparatively weak in low temperature, its growth is suppressed at temperatures below 5° C., and its multiplication is impossible at temperatures below 10° C. However, enteritis Vibrio can live in seawater and attaches to the body surface or gill of fish and shellfish.

A sanitation management system according to HACCP which is composed mainly of Hazard Analysis (HA) and Critical Control Point (CCP) has been introduced for the establishment of measures against deterioration of food. From the point of view of said HACCP, the first step for the prevention of the deterioration in quality of marine products is also to maintain the quality thereof in the auction market which is the first channel of trade. Therefore, establishment of preferable sanitation management method based on the prevention of multiplication of harmful microorganisms including said enteritis Vibrio and the equipment for maintaining the quality of hauled fishes, the objects of auction, are strongly demanded.

SUMMARY OF THE INVENTION

The present invention was made in the light of the problems mentioned above. The object of the invention is to provide low temperature zone forming equipment having a storage function capable of effective control of temperature and humidity and a method and equipment for maintaining the quality of hauled fishes in an auction market of marine products such as fishes, shellfishes, for constituting a low temperature distribution system closely linked with a purchase and sale system in consideration of the characteristics of the market.

The low temperature distribution system according to the present invention is characterized in that, in a low temperature distribution system having a separate purchase and sale system, low temperature zone forming equipment for keeping in storage the object to be distributed has a temperature and humidity censer and a control means for sending the data detected with the censers to a purchase and sale system.

As cited above, the invention is low temperature forming equipment in a low temperature distribution system which has a separate purchase and sale system and in which the temperature of merchandise is controlled in the flow thereof from production to consumption.

For example, the landed and auctioned hauled fishes before shipment are temporarily kept in storage under controlled temperature and humidity by use of temperature and humidity censers in the space surrounded with the enclosure wall. The system is provided with a data transmission control means to certify to buyers in remote districts the storage condition data of the fishes displayed under a proper low temperature and humidity controlled. The temperature may be indicated on the enclosure wall and the picture may be distributed to markets in remote districts. When buyers are on the same place, the temperature may be display only on the wall.

It is preferable that said low temperature zone forming equipment has a means for forming a low temperature zone of controlled humidity around the objects to be kept in storage, the means having a cooler, humidity controlling means, and air flow forming apparatus.

The low temperature forming equipment according to the present invention has a humidity controlling function other than that of controlling temperature in its storage function in addition to the means to send said storage condition data to the buyers in remote districts. The equipment is provided with a temperature control means having a cooler and a humidity control means having a humidity controller referred to later, by which the chilled air of predetermined temperature and relative humidity is obtained. Further, a low temperature zone of controlled humidity is formed around the objects to be kept in storage by the use of a blower or agitator.

Accordingly, the objects to be kept in storage are kept in a low temperature state and the transfer of moisture between the surface of the objects and the low temperature zone is prevented.

As a result, in the case of not-frozen foodstuff the transfer of moisture to the ambient air from the surface of the foodstuff and drying thereof is prevented, in the case of frozen fishes such as frozen tuna the condensation of moisture or frosting on the surface thereof, or thawing in its turn is prevented, and the quality is maintained.

It is preferable that said humidity control means has a dehumidifier for preventing dew-condensation or frosting due to phase-change for the frozen objects to be kept in storage, and a humidifier for increasing the dew-point temperature in the zone above the surface temperature of the object to prevent the transfer of moisture between the surface of the object and the ambient air of not-frozen, perishable foods, the objects to be kept in storage.

Thus, in the case the object to be kept in storage is a frozen fish such as tuna, the relative humidity of the low temperature zone surrounding the object is decreased to prevent the transfer of moisture by controlling humidity, and in the case the object to be kept in storage is a not-frozen, perishable foodstuff, the humidity of the low temperature zone surrounding the object is controlled so that the dew-point temperature is higher than the surface temperature of the object, for when said dew-point temperature is lower than that of the surface of the object, the transferring of the moisture from the surface of the object to the low temperature zone occurs, and the value as merchandise is damaged due to the drying of the surface thereof.

It is preferable that said low temperature zone forming equipment is composed of a chilled air generator comprising a cooler with a blower and an enclosure wall composed of a flexible, hollow structure surrounding the objects to be kept in storage, said enclosure wall having ports for entrance and exit of water, a connection port for supplying the chilled air from the chilled air generator at an end part thereof, and exhaust openings formed of knitted cloth along the inside face of the enclosure wall.

The invention cited above is an example of the structure of the low temperature zone forming equipment. The folded enclosure wall is inflated by blowing air thereinto. The wall is brought to intimate contact with the part of the floor formed into an anchor part. The chilled air produced by the chilled air generator located outside the enclosure wall is supplied to the inflated enclosure wall which itself functions as a duct, and the chilled air flows through the hollow space in the inflated wall and exhausted from exhaust openings formed of knitted cloth provided on the inner side face of the enclosure wall to the ambient space of the objects kept in storage within the enclosure to form the low temperature zone within the enclosure.

It is preferable that said low temperature zone forming equipment is composed of a chilled air generator comprising a cooler with a blower and a panel type enclosure wall surrounding the objects to be kept in storage, and a cross-duct connected to said chilled air generator is provided within the enclosure.

The invention cited above is another example of embodiment of the low temperature zone forming equipment.

Said chilled air generator is preferable to have a humidity controller.

In the low temperature zone forming equipment composed of said chilled air generator and enclosure wall, a humidity controller is attached to the chilled air generator to increase or decrease the humidity of the chilled air blown off into the enclosure. Thus the humidity in addition to the temperature of the low temperature zone is controlled to prevent the transfer of moisture between the surface of the object to be kept in storage and the air in the low temperature zone.

Said low temperature zone forming equipment may be composed of a cooler embedded in the floor, an enclosure wall for enclosing the objects to be kept in storage in the space occupied with the chilled air produced by said cooler, and an agitator for forming air flow by agitating the chilled air in the enclosed space.

The low temperature zone forming equipment cited above is a preferable structure of the type other than the types, each being composed of an enclosure wall and chilled air generator as described in the foregoing. In the equipment, a cooling part is placed under the surface of the floor of the low temperature zone, objects to be kept in storage are placed in the chilled air cooled by the cooling part and enclosed with an enclosure wall, and the chilled air within the enclosure is agitated by an agitator to form a low temperature zone of uniform temperature capable of being controlled.

It is preferable that a humidity controller is provided inside the enclosure; the humidity of the low temperature zone is decreased for the objects to be kept in storage in frozen state to prevent the occurrence of dew condensation or frosting due to phase-change of moisture on the surfaces of the objects; the humidity is increased for not-frozen, perishable foods, the objects to be kept in storage, to keep the dew-point temperature of water in the low temperature zone above the surface temperature of said objects for preventing the transfer of moisture from the surfaces of the objects.

In the low temperature forming equipment composed of a cooling part placed under the surface of the floor, an enclosure wall, and an agitator provided inside the enclosure, a humidity controller is provided inside the enclosure to secure highly effective storage performance by controlling the humidity in addition to the temperature within the enclosure. In the case the objects to be kept in storage are not-frozen, perishable foodstuff, drying of the food stuff is prevented by increasing the humidity of the low temperature zone so that the dew-point temperature of water in the zone is above the surface temperature of the objects, and in the case the objects to be kept in storage are frozen foodstuff, the occurrence of dew-condensation or frosting is prevented by decreasing the humidity.

Next, a quality maintaining method in an auction market of marine products according to the present invention is characterized in that hauled fishes are placed on carrying faces maintained near freezing temperature above 0° C., said hauled fishes are surrounded with an enclosure wall, chilled air of about 3° C. or below is blown to said hauled fishes, and the air temperature within the enclosure is kept at about 10° C. or below.

The invention is to perform the most suitable temperature control for the marine products just after landed in an auction market and to prevent the occurrence of severe problems in maintaining the quality afterward.

First of all, hauled fishes are placed on a cooled plate of which the surface temperature is kept near freezing temperature of water above 0° C. in order to prevent freezing, then the hauled fishes placed on the plate is surrounded with a enclosure wall to form a space partitioned from the surrounding space. Chilled air of about 3° C. or below is blown off into the enclosed space to produce the enclosed space of a temperature of about 10° C. or below at which temperature the multiplication of harmful bacteria including enteritis Vibrio is prevented, and the quality of the hauled fishes are maintained.

A preferable quality maintaining equipment in an auction market of marine products employing the quality maintaining method according to the present invention is an equipment capable of maintaining quality of perishable fish and shellfish in an auction market characterized in that the equipment is composed of cooling panels to place hauled fishes thereon; an air fence consisting of a foldable enclosure wall to surround the hauled fishes placed on said panels and a chilled air blow-off section provided on said enclosure wall; air curtains to shutoff the chilled air within the enclosure; and a chilled air generator comprising a cooler and blower for producing said chilled air; a space partitioning being done by said air fence and curtains, and the air temperature inside the partitioned space being maintained at low temperature of 10° C. or below by the chilled air of about 3° C. blown off from said chilled air blown-off parts.

In the equipment cited above, cooled panels are provided, a foldable air fence forms an enclosed space partitioned from the surroundings for enclosing the hauled fishes placed on the cooled panels, chilled air from a chilled air generator is introduced into a chilled air blow-off section at the bottom part of the fence from a connection port at an end of the air fence and blown off from the chilled air blow-off openings formed on the inside face of the air fence, and air curtains shutting out the chilled air enables the entrance and exit of the hauled fishes and workers. Chilled air of about 3° C.~7° C. is introduced from the chilled air generator into the fence to maintain the temperature of the low temperature zone within the enclosure partitioned with the fence at about 10° C. or below to prevent the multiplication of harmful bacteria including enteritis Vibrio adhering to the hauled fishes. The surface temperature of the cooled panels for placing thereon the hauled fishes to be auctioned is kept near freezing temperature above 0° C. in order to prevent the freezing of the hauled fishes thereon.

The cooled panel of said quality maintaining equipment may preferably be provided with an embedded tube connected to a brine cooler, or composed of a tube connected to a brine cooler and formed into a mat, the temperature of the surface thereof being maintained near freezing temperature above 0° C.

The invention cited above describes the structure of the cooled panel in the quality maintaining equipment. The cooled panel is composed of a tube embedded in the floor of the auction market or a mat having a tube integrated in the bottom part thereof or a tube formed into a mat, the tube being connected to a brine cooler operated using brine for food use to be supplied with brine of about −2° C. The temperature of the surface of the panel is maintained at 0° C. or a little higher.

The air fence of said quality maintaining equipment may preferably be a temporal wall of air balloon type and provided with a chilled air blow-off section on the inside upper or lower part thereof.

The invention cited above describes the structure of the air fence in the quality maintaining equipment. Air is pumped into a flat, flexible, air-tight vessel to expand it to form an enclosure wall on the lower or upper part of which is provided a chilled air duct having a plurality of openings for blowing off the chilled air.

The cooler of said quality maintaining equipment may preferably be an air-cycle refrigerator.

In the invention cited above, the chilled air generator in said quality maintaining equipment produces low temperature air by air-cycle refrigeration in which air is compressed and the compressed high pressure, high temperature air is cooled to near ordinary temperature, then the cooled air is expanded in an expansion turbine.

BRIEF DESCRIPTION OF THE DRAWINGS

FIG. 3(a) is a perspective view showing the diagrammatic sketch of the configuration of quality maintaining equipment in a marine products market according to the present invention, and (b) shows the folded state of the air fence shown in (a).

FIG. 4(a) is a plan view of FIG. 3(a) viewed from above, and (b) is a view in the direction of arrows. III—III in FIG. 4(a).

THE BEST MODE FOR CARRYING OUT THE INVENTION

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
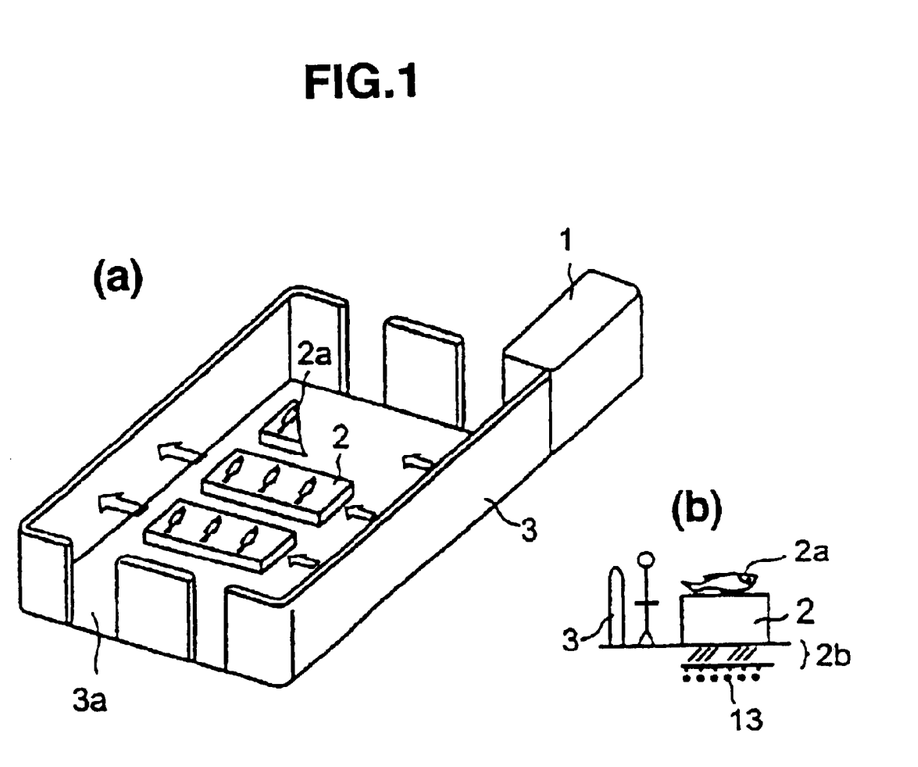
FIG. 1 is a representation showing an embodiment of low temperature zone forming equipment in a marine products market according to the present invention: (a) shows low temperature zone forming equipment of bathtub type, and (b) shows a partial cross section in (b).
Figure 2:
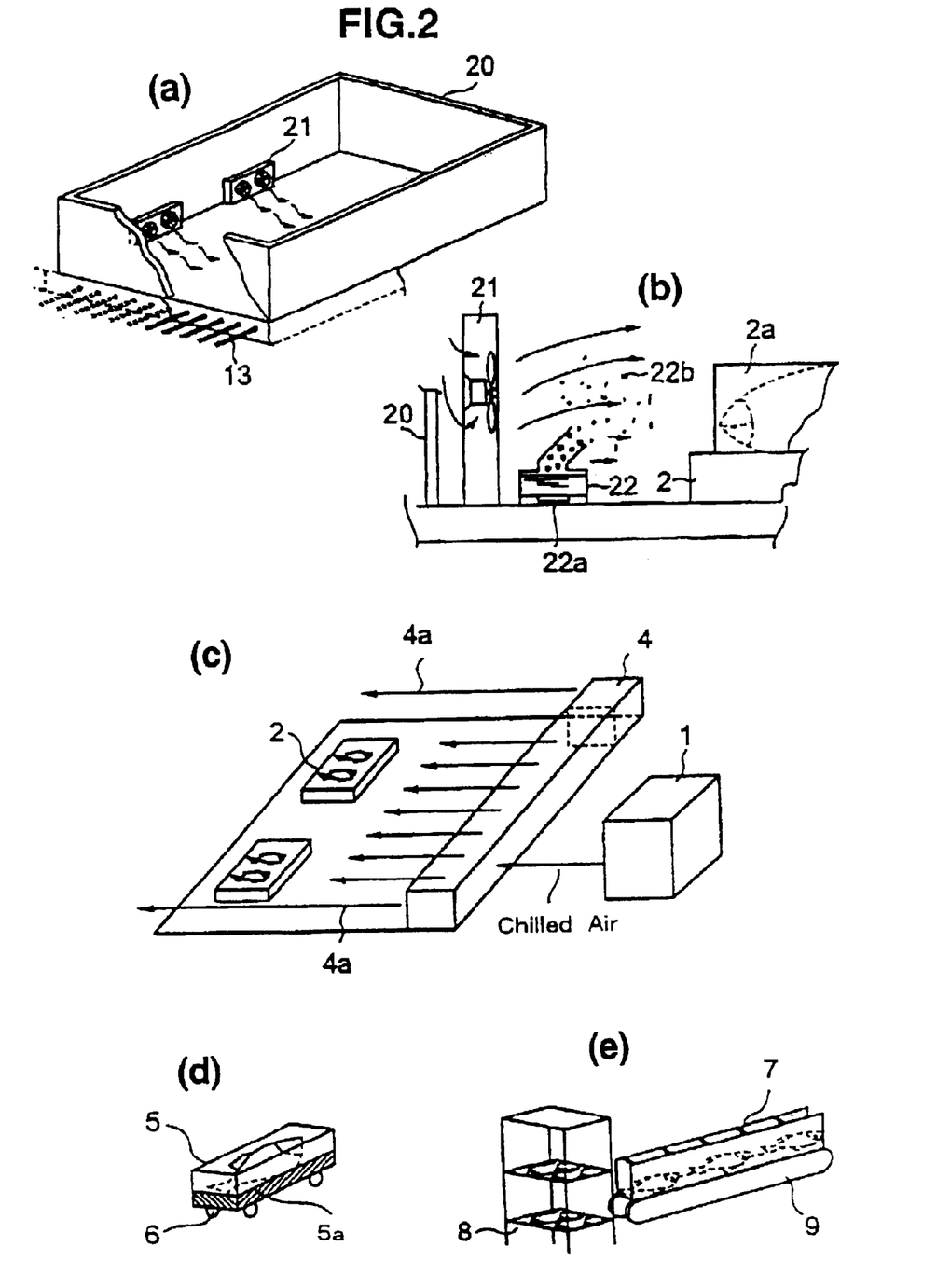
FIG. 2 is a representation showing another embodiment of FIG. 1: (a) shows low temperature zone forming equipment in the case the cooling section is embedded in the floor, (b) shows the situation of rapid humidification of the low temperature space of (a), (c) shows low temperature zone forming equipment in which the chilled air from the chilled air chamber provided on one side is blown through over the surface of drainboards, (d) shows low temperature zone forming equipment of distribution box type, and (e) shows low temperature zone forming equipment in which sorting, storage, purchase and sale, transfer, and arrangement of hauled fishes after landed are done on a conveyer line and the hauled fishes on the conveyer are surrounded by chilled air curtain.
Figure 3:
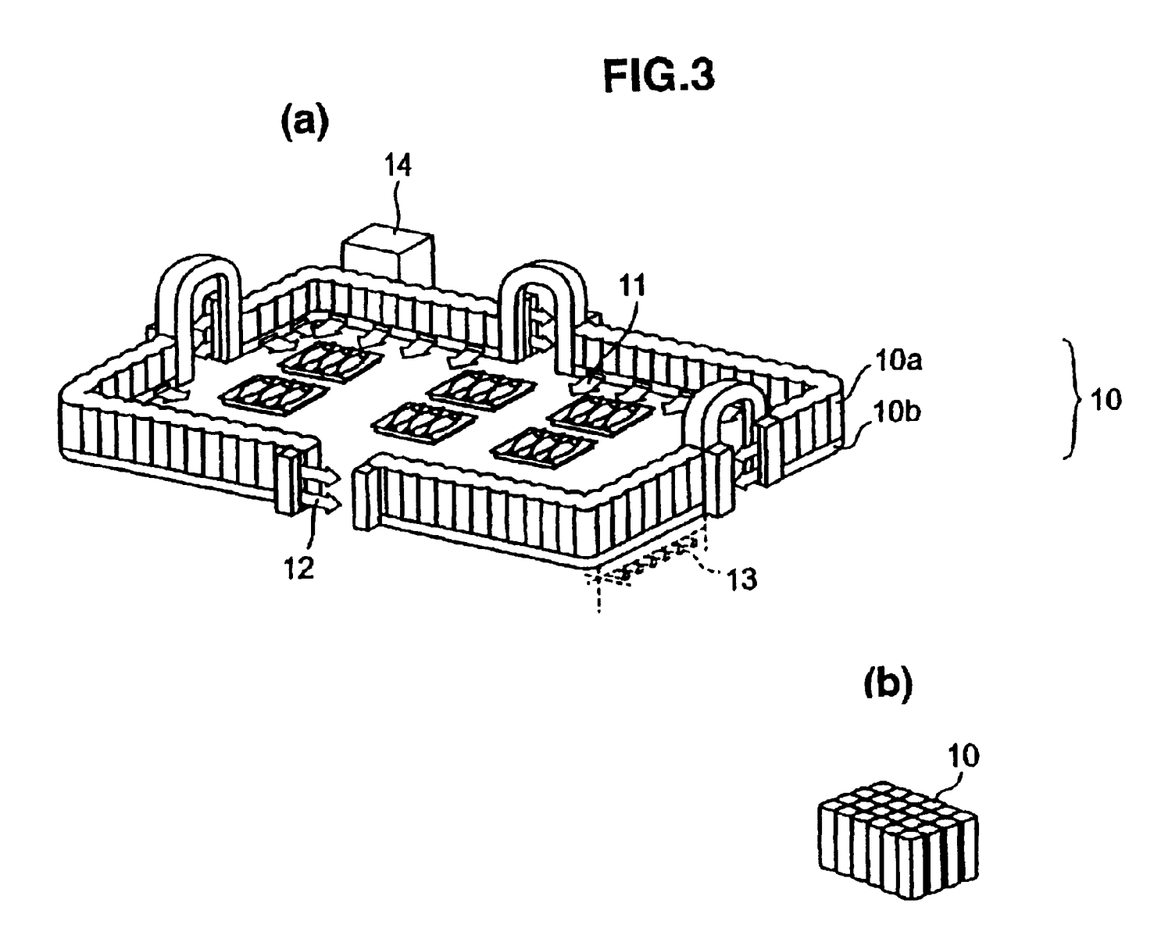
Figure 4:
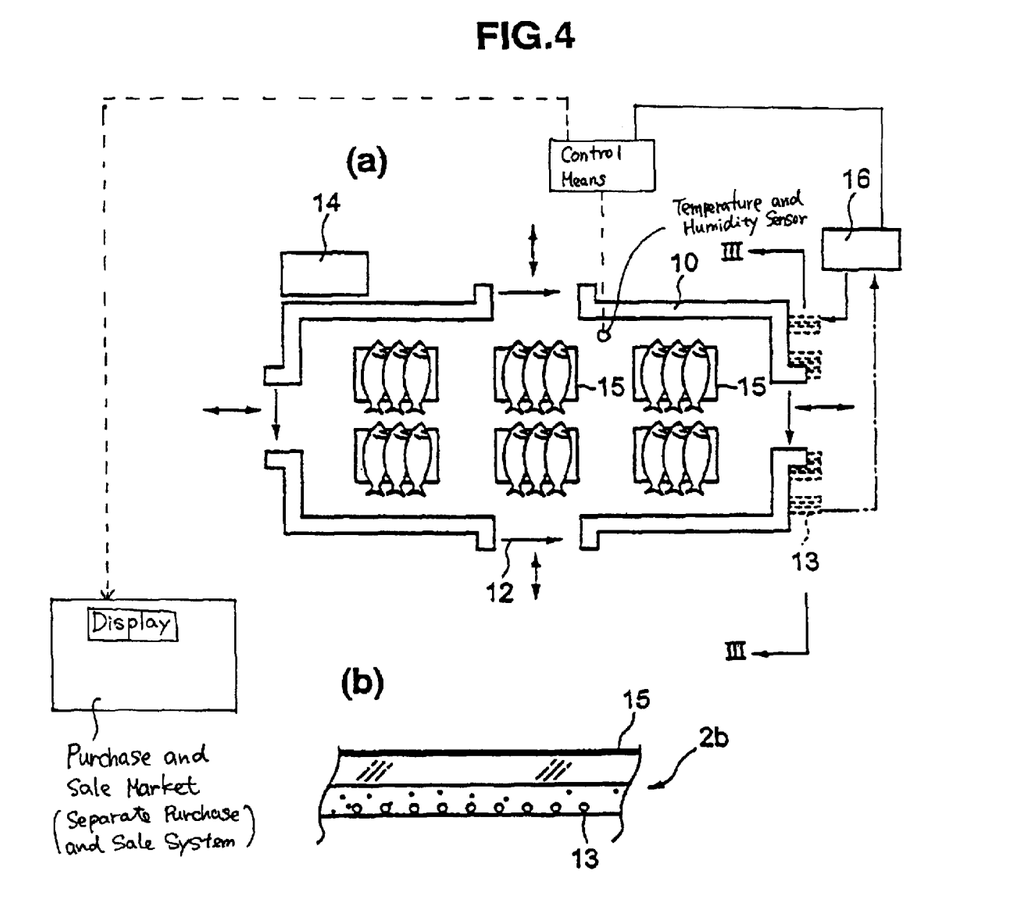

FIG. 1 shows an embodiment of low temperature zone forming equipment in a marine products market according to the present invention: (a) shows low temperature zone forming equipment of bathtub type, and (b) shows a partial cross section in (b). FIG. 2 shows another embodiment of FIG. 1: (a) shows low temperature zone forming equipment in the case the cooling section is embedded in the floor, (b) shows the situation of rapid humidification of the low temperature space of (a), (c) shows low temperature zone forming equipment in which the chilled air from the chilled air chamber provided on one side is blown through over the surface of drainboards, (d) shows low temperature zone forming equipment of distribution box type, and (e) shows low temperature zone forming equipment in which sorting, storage, purchase and sale, transfer, and arrangement of hauled fishes after landed are done on a conveyer line and the they are surrounded by chilled air curtain on the conveyer. FIG. 3(a) is a perspective view showing the diagrammatic sketch of the configuration of quality maintaining equipment in a marine products market according to the present invention, and (b) shows the folded state of the air fence shown in (a). FIG. 4(a) is a plan view of FIG. 3(a) viewed from above, and (b) is a view in the direction of arrows III—III.

FIG. 1 shows an embodiment of low temperature zone forming equipment in a marine products market according to the present invention; (a) shows low temperature zone forming equipment of bathtub type, and (b) shows a partial cross section in (b).

As shown in FIG. 1(a), the low temperature zone forming equipment is configured such that a plurality of drainboard 2 with hauled fishes laid thereon are surrounded by an enclosure wall 3, and the chilled air generated and adjusted to near freezing temperature of water in a chilled air generator 1 composed of a cooler and blower is blown off into the space enclosed with the enclosure wall 3. This configuration may be called bathtub type. The chilled air generator 1 is provided with a humidity controller not shown in the drawing to control humidity.

The enclosure wall 3 is made of flexible material. It is inflated and developed by supplying the chilled air from the chilled air generator 1 to be formed into a mat-shape wall, the humidity of the chilled air being controlled by the humidity controller built into the chilled generator 1.

The bottom forms the anchor part by flowing water therein and is brought into intimate contact with the floor. Inside the enclosure wall 3 is provided movably a sock-duct (the duct is made of cloth woven with continuous fiber and formed into a long cylindrical shape provided with air outlets on its surface) capable of expansion and contraction, and chilled air is supplied therein in the state of gentle wind so as not to make persons feel discomfort.

The landed hauled fishes 2a are placed on the drainboard 2, transferred by a fork-lift truck or hand hook to the inside space surrounded by the enclosure wall 3, and kept in storage in the low temperature region where the temperature is controlled to near freezing temperature and the humidity is controlled to that at which the dew-point temperature is higher than said controlled temperature.

A temperature and humidity censer attached to the equipment measures and records the temperature and humidity of the hauled fish on the drainboard 2, and the measured value is indicated on the spot or transmitted over a communication circuit together with the data of the individual hauled fish if the auction is done at a remote market.

Air curtains 3a are provided at several parts of the enclosure wall 3 for the comings and goings of the forklift trucks and persons concerned.

A complete set of the equipment can be carried on a vehicle, and the carrying-in and removal of the equipment can be completed speedily.

As shown in FIG. 1(b), the floor is cooled with a cooling mat 2b if necessary. The cooling mat 2b may be, for example, equipped with a cooling brine tube 13 and embedded in the floor.

In the case the cooling section is embedded in the floor as is mentioned above, a chilled air agitator 21 and a humidity controller not shown in the drawing are provided inside the enclosure wall 20 as shown in FIG. 2(a).

The hauled fish, the objects to be kept in storage, are placed on the drainboard in raw or in frozen state. Or they are packed in a vessel with ice and displayed with the cover removed.

Therefore, the objects to be cooled are located in the position somewhat apart from the floor. A low temperature zone consisting of a layer of certain thickness of low temperature air is formed by agitating the chilled air spreading on the floor by the chilled air agitator 21, and the hauled fish, the object to be kept in storage, are kept in temporal storage in the low temperature zone consisting of a low temperature air layer of uniform temperature.

Further, as the hauled fishes are displayed in various states such as raw state, packed state with ice, or frozen state as mentioned above, it is necessary to form the low temperature zone in accordance with the various states. To meet the circumstances, following measures are adopted.

In the case of raw state or packed state with ice, it is necessary, since the surface of the hauled fish is in a uniform temperature in the neighborhood of 10° C.~0° C. of the low temperature zone, to control the humidity of the zone to the value at which the dew point temperature of water is higher than that of the surface of the objects.

Under ordinary atmospheric conditions, lowering the ambient temperature of the hauled fish by forming the low temperature zone accompanies dehumidification effect. Accordingly, evaporation of moisture occurs from the surface of the hauled fish if the temperature of the surface is higher than that of the chilled air, and drying of the surface is effected.

The drying can be prevented by rapid increase in humidity of the low temperature zone. This is done, for example, by operating the vibrator 22a of an ultrasonic humidifier 22 as shown in FIG. 2(b). By the generation of atomized particles 22b of water in the low temperature zone, the relative humidity of the low temperature zone can be increased to near 100%.

When the dew-point temperature in the low temperature zone becomes higher than that on the surface of the hauled fish, the transfer of moisture from the surface of the hauled fish ceases and the drying stops.

The floor is sprayed with water and heat transfer coefficient is large, and chilled air agitation speed is fast, so rapid humidification is desirable.

FIG. 2(c) shows a type of low temperature zone forming equipment in which a chilled air generator 1 having a built-in humidity controller is located at one side of the zone, the chilled air blown off from a chilled air chamber 4 flows over the surfaces of drainboards 2 on which hauled fishes 2a are placed. In this case air curtains 4a of ordinary temperature are formed on both sides of the zone parallel to the flow of the chilled air.

In the case the quantity of arrival of merchandise is large and the bathtub type shown in FIG. 1(a) is not able to accommodate all of them, a modification may be done in which the leeward side in FIG. 2(a) is opened and the method of FIG. 2(c) is combined.

FIG. 2(d) shows low temperature forming equipment using distribution boxes 5 and platform cars 6. Cold heat energy accumulating material (a cold agent) 5a is contained in the distribution box to cool the hauled fish 2a in the box.

FIG. 2(e) shows the low temperature zone forming equipment in which sorting, storage, purchase and sale, transfer, and arrangement of hauled fishes after landed are done on a conveyer line composed of a conveyer 9 and a rack 8, and the hauled fishes 2a on the conveyer 9 are surrounded by chilled air curtain 7.

Temperature censers and a control means for recording and sending to external systems the data of the temperature of the hauled fish or the storage section thereof measured by the censers are provided also in each low temperature forming equipment of FIGS. 2(c), (d), and (e).

In FIG. 3(a) is shown a perspective view showing the diagrammatic sketch of the configuration of quality maintaining equipment in a marine products market according to the present invention, and in FIG. 4(a) is shown a plane view of the equipment viewed from above.

As can be seen in the figures, the equipment is composed of cooled panels 15, an air fence 10 comprising an foldable enclosure wall 10a having a chilled air blow-off section (duct) 10b and surrounding the hauled fishes 2a placed on the cooled panels 15, air curtains 12 for shutting off the chilled air in the space surrounded with the enclosure wall 10a, and a chilled air generator 14. The chilled air in the enclosed space is shut off from the outside by partitioning the space with the air fence 10 and air curtains 12. The temperature in the enclosed space partitioned with the enclosure wall 10a is maintained at about 10° C. or below by blowing off chilled air of about 3° C. from the chilled air blow-off duct 10b. The hauled fishes placed on the cooled panels 15 are thus kept in storage in the space of low temperature of about 10° C. or below. Accordingly, harmful bacteria including enteritis Vibrio adhering to the body or gill of the hauled fish are inhibited from multiplication and the quality maintenance is attained, preventing severe harm in the handling thereafter.

The temperature of the chilled air is preferable to be +3° C.~-7° C.

The air fence 10 is composed of a chilled air blow-off duct 10b and an enclosure wall 10a of air balloon type. The chilled air blow-off duct lob is provided with a plurality of openings for blowing off the chilled air. The chilled air 11 of temperature of about 3° C. or below is blown off from the opening into the enclosed space to keep the temperature of the space at about 10° C. or below. All of the hauled fishes 2a on the cooled panels 15 are thus placed in the low temperature zone. Thus, the quality maintenance accommodating to the Foodstuff Sanitation Law is instituted.

The enclosure wall 10a is made of flexible material that does not permit the passage of air and formed into a foldable structure. So, it can be folded to a compact shape as shown in FIG. 3(b) in a short time when dismantling. The enclosure wall can be formed easily and efficiently in a short time by pumping air into the folded structure.

The panel, curtain, and so forth may be made of thermal insulating material.

The height of the enclosure wall may be determined optionally.

The cooled panel 15 for placing the hauled fishes 2a thereon has a cooling brine tube 13 embedded therein. Brine for food use(calcium chloride, propylene glycol, etc.) of about -2° C. produced by a brine cooler 16 is flowed in the brine tube 13 placed under the surface of the floor as shown in 4(b) which shows a view in the direction of arrows III—III in FIG. 4(a). The temperature of the carrying surface on which the hauled fishes are placed is kept at a temperature near the freezing point of water above 0° C. so that the hauled fishes 2a on the cooled panel 15 do not freeze.

The air curtains 12 is to prevent the leakage of the chilled air, doors may be used instead.

The chilled air generator 14 is to produce the chilled air of about 3° C. or below through heat exchange by operating refrigerating cycle. Low temperature air may be obtained by operating air-cycle refrigeration, in which air is compressed and the compressed high pressure, high temperature air is cooled to near ordinary temperature, then the cooled air is expanded in an expansion turbine to obtain low temperature air.

Effects of the Invention

The present invention will be implemented in such forms as have been described in the foregoing and bring about the following effects:

A high performance low temperature distribution system is obtained by composing a highly functional low temperature distribution system in which merchandise storage condition data in a market is kept in a close connection with purchase and sale systems scattered in remote districts and low temperature zone forming equipment having a storage function capable of controlling temperature and humidity. With the system the reliability of merchandise is increased as the low temperature storage data in the market is reserved.

With the system in which a method and equipment for maintaining the quality of marine products in an auction market, multiplication of harmful bacteria including particularly enteritis Vibrio on the hauled fishes after landing is effectively prevented at the water's edge.

What is claimed is:

1. A low temperature physical distribution system for use with a separate purchase and sale system, said distribution system comprising means for forming a low temperature zone of controlled humidity for storing objects to be distributed, said zone forming means comprising a cooler, humidity controlling means, air flow forming apparatus, a temperature and humidity sensor and a control means for sending data detected with said sensor to the purchase and sale system, wherein the objects to be stored comprise unfrozen, perishable foods and the humidity controlling means comprises a humidifier for preventing transfer of water from surfaces of stored, unfrozen, perishable foods by keeping the dew-point temperature in the low temperature zone above the surface temperature of said stored foods.

2. A low temperature physical distribution system for use with a separate purchase and sale system, said distribution system comprising means for forming a low temperature zone of controlled humidity for storing objects to be distributed, a temperature and humidity sensor, and control means for sending data detected with said sensor to said purchase and sale system, said low temperature zone forming means comprising a chilled air generator comprising a cooler and blower, and an enclosure wall composed of a flexible hollow structure surrounding the objects to be kept in storage, said enclosure wall having ports for entrance and exit of water, a connection port for supplying the chilled air from the chilled air generator at an end part thereof, and exhaust openings formed of knitted cloth along an inside face of the enclosure wall.

3. A low temperature physical distribution system according to claim 2 characterized in that said chilled air generator is provided with a humidity controller.

4. A low temperature physical distribution system for use with a separate purchase and sale system, said distribution system comprising means for forming a low temperature zone of controlled humidity for storing objects to be distributed, a temperature and humidity sensor, and control means for sending data detected with the sensor to said purchase and sale system, said low temperature zone forming means comprising a cooler embedded in a floor, an enclosure wall for enclosing the objects to be kept in storage in space occupied with chilled air produced by said cooler, and an agitator for forming air flow by agitating the chilled air in the enclosed space.

5. A low temperature physical distribution system according to claim 4 characterized in that a humidity controller is provided inside said enclosure; the humidity of the low temperature zone is decreased for the objects to be kept in storage in frozen state to prevent the occurrence of dew condensation or frosting due to phase-change of moisture on the surfaces of the objects; the humidity is increased for not-frozen, perishable foods, the objects to be kept in storage, to keep the dew-point temperature of water in the low temperature zone above the surface temperature of said objects for preventing the transfer of moisture from the surfaces of the objects.

* * * * *